(12) United States Patent
Rohwer

(10) Patent No.: US 7,494,023 B2
(45) Date of Patent: Feb. 24, 2009

(54) INSULATION FOR CRYOGENIC TANKS

(75) Inventor: Thorsten Rohwer, Trebur (DE)

(73) Assignee: General Motors Corporation, Detroit, MI (US)

( * ) Notice: Subject to any disclaimer, the term of this patent is extended or adjusted under 35 U.S.C. 154(b) by 834 days.

(21) Appl. No.: 11/069,372

(22) Filed: Mar. 1, 2005

(65) Prior Publication Data

US 2006/0196876 A1    Sep. 7, 2006

(51) Int. Cl.
*F17C 1/12* (2006.01)
*F17C 3/04* (2006.01)
*F17C 13/00* (2006.01)

(52) U.S. Cl. .............................. 220/560.12; 220/592.26

(58) Field of Classification Search .............. 220/560.1, 220/560.12, 560.13
See application file for complete search history.

(56) References Cited

U.S. PATENT DOCUMENTS

| 5,374,476 | A | 12/1994 | Horsley |
| 5,590,054 | A | 12/1996 | McIntosh |
| 6,521,077 | B1 | 2/2003 | McGivern et al. |

*Primary Examiner*—Anthony D Stashick
*Assistant Examiner*—Harry A Grosso

(57) ABSTRACT

A magnetic multi-layer insulation system for a cryogenic storage tank. The system includes multiple layers of insulation comprising a carrier support structure disposed between a first major surface of a magnetic material defining a north pole facing away from the carrier support structure, and a second and opposite major surface of a magnetic material defining a south pole facing away from the carrier support structure. A reflective surface, or metal foil, is disposed adjacent the magnetic poles to deflect radiation. The layers are repelled from one another without the use of spacers. In various embodiments, the magnetic material is a permanent magnet selected from the group consisting of Samarium-Cobalt, Alnico, Neodymium-Iron-Boron, an alloy of the Lanthanide group of elements, and mixtures and alloys thereof.

17 Claims, 3 Drawing Sheets

INSULATION FOR CRYOGENIC TANKS

FIELD OF THE INVENTION

The present invention relates generally to cryogenic liquid storage tanks, and more particularly, to an improved cryogenic liquid storage tank insulation.

BACKGROUND OF THE INVENTION

Fuel cells have been proposed as a power source for electric vehicles and other applications. In proton exchange membrane (PEM) type fuel cells, hydrogen is supplied to the anode of the fuel cell and oxygen is supplied as the oxidant to the cathode. A common technique for storing large quantities of hydrogen is to cool and compress hydrogen via liquefaction techniques and store the liquid phase hydrogen in a cryogenic storage tank. Hydrogen gas liquefies at −253° C. and ambient pressure, and can be stored at about 70 g/L in the liquid phase. The amount of energy required to compress hydrogen gas into a liquid is very high, and currently may be as much as up to 40% of the energy obtained from using the gas as a fuel. Thus, it is advantageous to keep the liquid phase hydrogen as insulated as possible from the surrounding ambient temperature.

Any transfer of heat to the innermost portion of the cryogenic storage tank affects the natural evaporation rate of the cryogenic vessel. The more heat that is transferred, the faster the rate of boil-off of the liquid hydrogen, or the higher the natural evaporation rate. In order to maintain the hydrogen in a liquid state, thereby minimizing excess vaporization and the need to vent the tank in order to release excess pressure, heat transfer from the ambient environment to the cryogenic tank must be kept to a minimum.

Conventional cryogenic tanks, such as the tanks used to supply hydrogen gas to a fuel cell, are commonly made of aluminum or stainless-steel alloys. The storage tanks generally consist of an inner storage vessel encapsulated with an outer vessel, or shell. The vessels are commonly separated from one another with metal supports and the space between the inner vessel and the shell is well insulated and under a vacuum. Multi-layer insulation has been used for quite some time to insulate cryogenic tanks. For constant surface emissivities in a vacuum of $10^{-5}$ Torr or lower, heat transfer usually decreases with $1/N$, where N is the number of reflective insulation layers disposed between the vessel's warm and cold surfaces.

One common type of vacuum-insulation system includes the use of "super-insulation" or "SI". SI systems generally include multiple layers of metallized film along with a distribution of protrusions, or spacer materials, provided between the layers to prevent face-to-face contact when the films are wrapped around the inner tank and subsequently around one another. As one of the primary sources of heat transfer, the spacers bridge the insulation that is present, and allow heat from the ambient environment to penetrate into the inner vessel, leading to detrimental effects on the overall thermal insulation. Accordingly, there is a need for an improved cryogenic liquid storage tank, and particularly, one that minimizes heat convection between the insulation and inner and outer tanks.

SUMMARY OF THE INVENTION

The present invention provides a multi-layer insulation system for a cryogenic storage vessel. The system provides multiple layers of insulation having a carrier support structure with a first side supporting a magnetic material with a magnetic north pole, and a second and opposite side supporting a material having a magnetic south pole. A reflective surface, or metal foil, is disposed adjacent the magnetic material to deflect radiation. In various embodiments, the magnetic material is a permanent magnet selected from the group consisting of Samarium-Cobalt, Alnico, Neodymium-Iron-Boron, an alloy of the Lanthanide group of elements, and mixtures and alloys thereof.

In another embodiment, the present invention provides a cryogenic storage system including an inner tank having a containment volume for storing a cryogenic fluid. An outer tank surrounds the inner tank and defines an insulation space having a pressure less than atmospheric pressure. At least two insulation layers are disposed in the insulation space surrounding the inner tank. The insulation layers are separated from one another by magnetic repulsion. Preferably, the insulation includes between about 20 to 40 layers, each about 50 to 90 microns in thickness, separated from one another by a magnetic field having a flux density of about 0.4 Tesla.

The present invention also relates to a method of insulating a cryogenic storage vessel. The method includes providing an inner tank surrounded by a plurality of magnetically repelled insulation layers. An outer tank is provided surrounding the insulation layers, defining a sealed vacuum cavity for the insulation layers between the inner and outer tanks.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
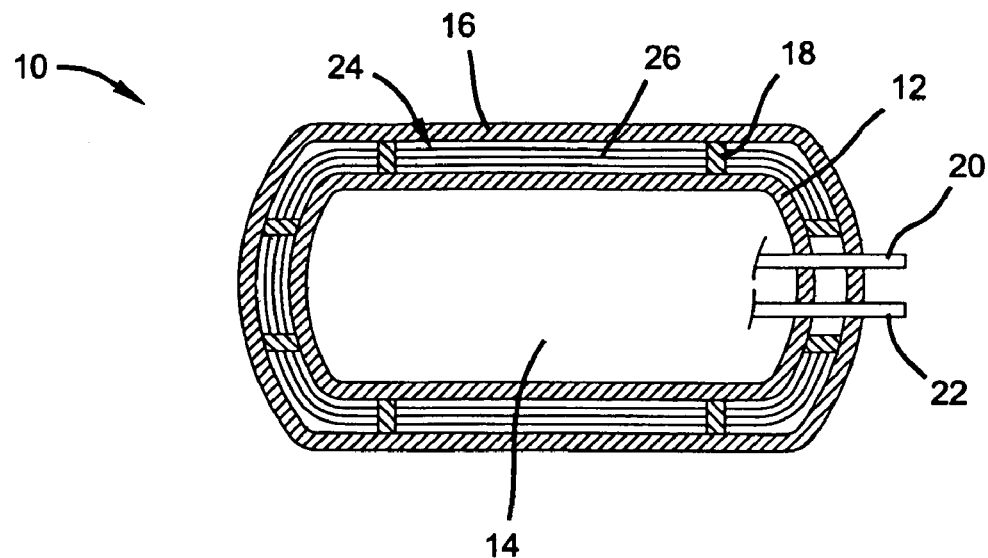
FIG. 1 is a cross-sectional view illustrating a prior art cryogenic storage tank.

FIG. 1. is a cross-sectional view illustrating a typical design of a cryogenic storage tank 10. As illustrated, the cylindrical shaped storage tank 10 includes an inner vessel 12 having a containment volume 14 and surrounded by an outer vessel, or shell 16. The inner vessel 12 is generally separated from the shell 16 by a plurality of insulated cross supports 18 that prevent contact between the inner vessel 12 and the shell 16. One means of fluid communication into and out of the containment volume 14 is accomplished using an inlet port 20 and an outlet port 22, respectively. The cavity, or space 24 between the inner vessel 12 and the shell 16 is typically filled with a multi-layered thermal vacuum insulation 26 as is known in the art. The shell 16 operates to maintain a vacuum in the space 24 surrounding the inner vessel 12 for the effective operation of the insulation 26. A typical vacuum used for efficient operation of the vacuum insulation is about $7.5 \times 10^{-5}$ Torr. Although a vacuum is not generally required to store pressurized hydrogen or other gases at ambient temperature, a vacuum is preferred when the containment volume 14 is filled with a cryogen for optimal insulation of the tank 10. As used herein, the term "cryogen" is used to refer to any substance in liquid phase that boils at or below about −160° C. when under standard atmospheric pressure. Non-limiting examples of cryogens include oxygen, nitrogen, hydrogen, and many refrigerants commonly known in the art.

Figure 2:
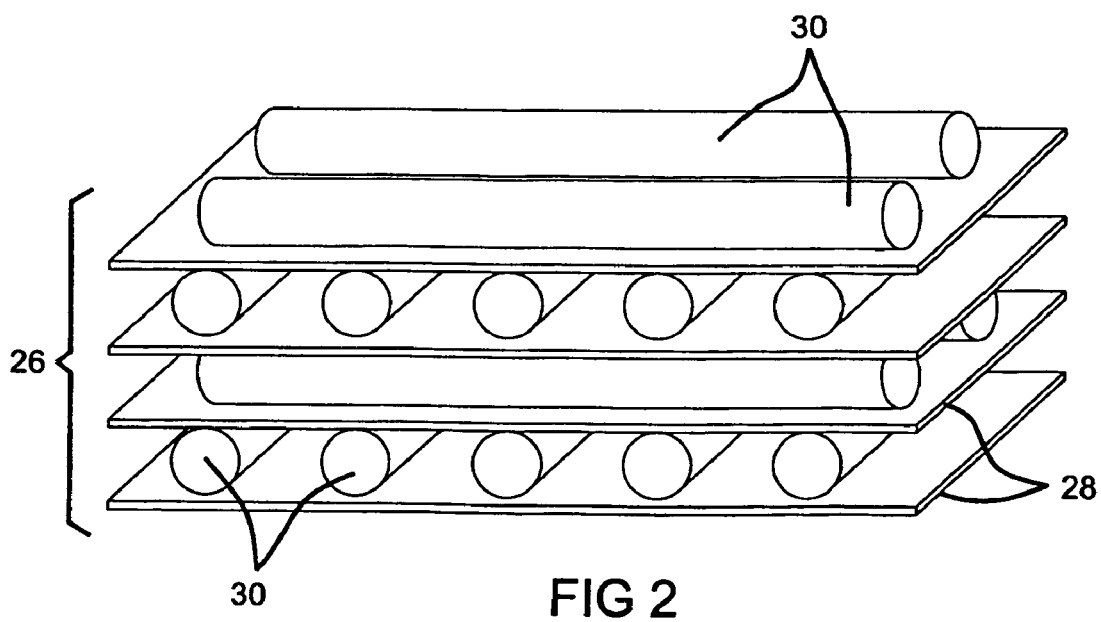
FIG. 2 is a partial perspective view illustrating the multi-layer insulation of the prior art cryogenic storage systems.

FIG. 2 is a partial perspective view illustrating the typical multi-layer insulation 26 used in the prior art cryogenic storage systems. The insulation 26 includes a plurality of fibrous layers 28, or thin foils, separated by a plurality of spacers 30 to prevent the layers 28 from contacting one another. The size and the shape of the spacers 30 may vary, as well as their orientation and placement between the layers 28. The spacers 30 are typically a plastic material, such as polyethylene terephthalate (PET), and assist in the prevention of "heat shorts", in which the cold side of one foil layer contacts the hot side of an adjacent layer. In practice, however, due to the number of spacers 30 required to prevent the layers 28 from contacting one another, the spacers 30 bridge the insulation 26 that is present, and allow heat from the ambient environment to penetrate into the inner vessel 12, leading to detrimental effects on the overall thermal insulation.

Figure 3:
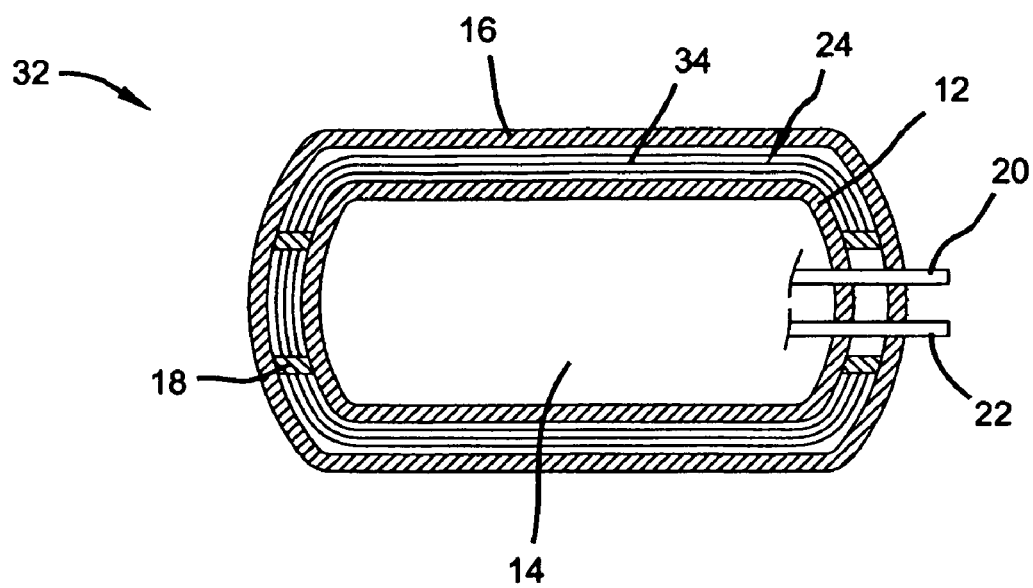
FIG. 3 is a cross-sectional view illustrating a cryogenic storage tank according to the principles of the present invention.

As shown in FIG. 3, the cryogenic compatible storage tank 32 according to the principles of the present invention is similar to a typical cryogenic tank 10 in most aspects; however, it replaces the prior insulation 26 with magnetic multi-layer insulation 34 that prevents heat shorts without the use of spacers 30. Additionally, fewer cross supports 18 are required to prevent contact between the inner vessel 12 and the outer shell 16.

Figure 4:
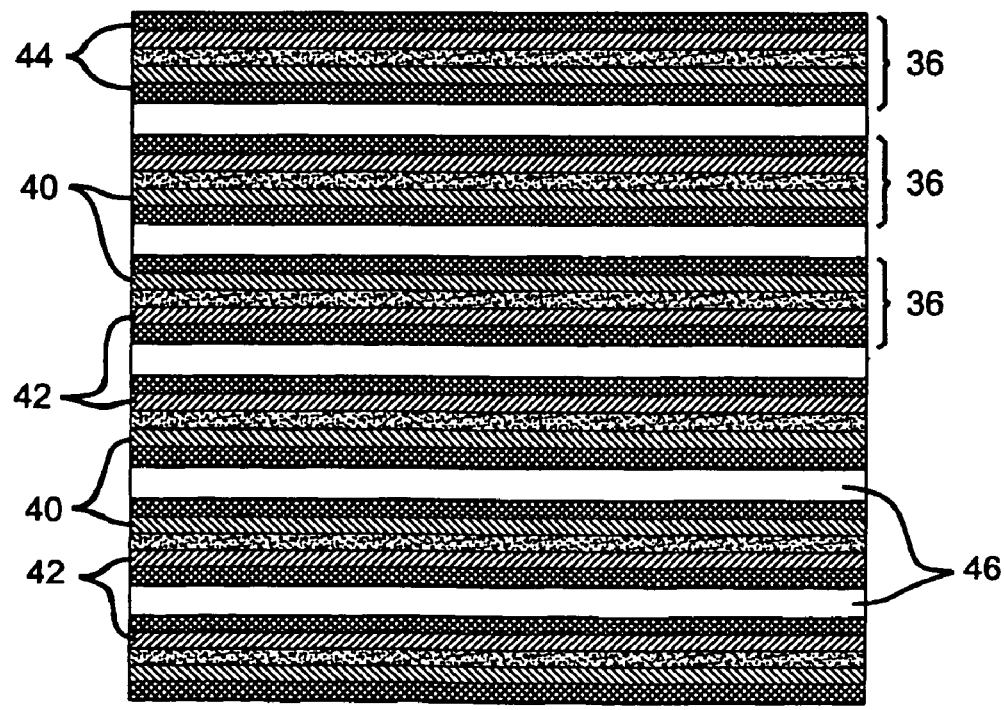
FIG. 4 is a partial cross-sectional view illustrating the multi-layer insulation according to the principles of the present invention.
Figure 5:
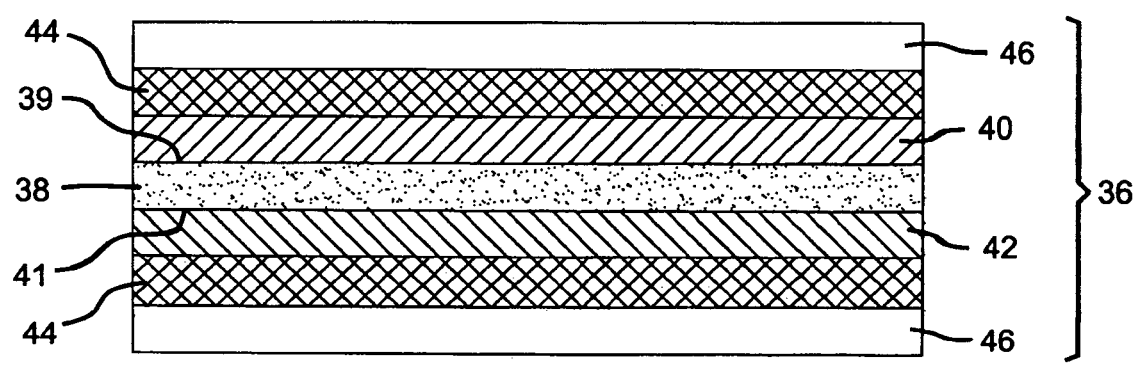
FIG. 5 is a magnified view of an insulation layer of FIG. 4.

FIG. 4 illustrates a partial cross-sectional view depicting the magnetic multi-layer insulation 34 of the present invention. The magnetic multi-layer insulation 34 includes a plurality of layers 36 stacked adjacent one another and separated by magnetic repulsion. FIG. 5 is a magnified view of a single insulation layer 36 of FIG. 4. Each layer 36 includes a substrate, or carrier support structure 38, that is preferably a metallized polyester film. In one embodiment, the carrier support structure 38 comprises a biaxially-oriented polyethylene terephthalate (BOPET) polyester film, such as Mylar® or double aluminized Mylar®. The carrier support structure 38 has a first major surface 39 that is adjacent to and supports a magnetic material 40 aligned having a magnetic north pole, and a second and opposite major surface 41 that is adjacent to and supports a magnetic material 42 aligned having a magnetic south pole. In various embodiments, a heat radiation barrier such as a reflective surface coating, or reflective foil layer 44, is disposed adjacent the magnetic materials 40, 42 to deflect radiation.

The insulation layers 36 can be manufactured in a variety of ways. In one embodiment, the layers 36 are formed using an extrusion process. For example, the carrier support structure 38 is meshed with the desired magnetic material particles. During the extrusion process, an electromagnetic field is used to align the particles such that the carrier support structure 38 is sandwiched by a layer of magnetic material 40 exhibiting a magnetic north pole adjacent a first major surface 39, and a layer of magnetic material 42 exhibiting a magnetic south pole adjacent a second and opposite major surface 41.

Once the layer is extruded, it is placed in a vacuum chamber where the material selected to form the reflective coating, typically aluminum, is vaporized by heating. The vaporized aluminum condenses out of the vacuum and onto the insulation surfaces, creating a very thin and highly reflective foil layer 44. In various other embodiments, the insulation layers 36 are created using a layering manufacturing process, wherein the magnetic particles are disposed in a separate layer and bonded to the substrate 38.

In various embodiments, the insulation 34 includes from about 20 to about 40 layers. It should be understood that the number of layers may be increased or decreased as necessary based upon, for example, the overall design parameters, the materials used, and the cryogenic fluids being stored. As shown in FIG. 4, the insulation layers 36 are arranged having the north pole of one layer's magnetic material 40 adjacent the north pole of a neighboring layer's magnetic material 40, and the south pole of one layer's magnetic material 42 adjacent the south pole of a neighboring layer's magnetic material 42. This arrangement repels adjacent layers 36 from one another, separating them and leaving a vacuum space 46 in between.

The thickness of each insulation layer 36 depends mainly on the magnetic materials and the method(s) of production. Generally, the carrier support structure 38 is from about 10 to about 20 microns in thickness, and the magnetic material layers 40, 42 are from about 40 to about 50 microns in thickness. The thickness of the magnetic material layers 40, 42 will mainly depend upon the specific magnetic material and the field strength required to prevent contact of adjacent insulation layers 36. In certain embodiments, the field strength is related to the distance between the north and south pole of the magnetic particles. Thus, in various embodiments, each layer 36 typically has an overall thickness from about 50 to about 200 microns, preferably less that about 100 microns, or from about 50 to about 90 microns. It should be understood that the layer thickness can be increased or decreased, depending on the design and selection of materials, and these variations are within the scope of the present invention.

Various preferred embodiments of the present invention provide the magnetic fields, or materials 40, 42, exhibiting north and south poles from permanent magnetic materials or rare earth compositions. Permanent magnetic materials include material compositions exhibiting magnetic field strength over a wide range. For example, the magnetic materials preferably provide a magnetic field having a flux density from about 0.2 to about 0.5 Tesla, more preferably, the flux density is at least about 0.4 Tesla.

Non-limiting examples of permanent magnet materials applicable to the present invention include commonly used commercial grade magnets, including Ferrites, Samarium-Cobalt, Neodymium-Iron-Boron, alloys of the Lanthanide group of elements, and Alnico. As used herein, Alnico includes any of the several hard, strong alloys of iron, aluminum, nickel, cobalt and sometimes copper, niobium, or tantalum, used to make strong permanent magnets. In one presently preferred embodiment, $SmCo_5$ is used.

Physical properties such as strength and brittleness of the desired magnetic material may influence the overall properties of the insulation, and should be considered prior to the material selection. Another important consideration of the magnetic material selection is the allowable operating temperature; preferably the magnetic material exhibits magnetic capabilities between cryogenic temperatures and upwards of 60° C., or higher. Optionally, in certain embodiments, electromagnetic materials can be used, however these embodiments have the disadvantage of requiring a power source.

The foil layer 44 is selected from any suitable reflective material as known in the art. Non-limiting examples include aluminum foil, gold foil, copper foil, silver foil, zinc foil and mixtures thereof. In one embodiment, the foil comprises vaporized aluminum. The foil layer 44 is preferably only a few atoms in thickness. In various embodiments, the foil layer 44 has a thickness from about 0.5 to about 10 microns, preferably less than about 5 microns, for example, from about 1 to about 3 microns. Preferably, the foil layer 44 is selected to allow certain flexibility without breaking or tearing, and should function properly at cryogenic temperatures. Accordingly, this thin foil layer 44 provides suitable heat and radiation reflective properties without the addition of excess materials, space and weight.

The magnetic multi-layer insulation 34 of the present invention may be arranged having uniformly or variably spaced layers 36. The vacuum space 46, or separation distance, between layers is dependent upon the flux density generated by the specific magnetic material used in addition to the thickness of the magnetic materials 40, 42 of the layers 36. In various embodiments, the thickness of the magnetic materials 40, 42 is the same for each layer 36. In this case, the separation distance between adjacent insulation layers 36 is uniform, and the layers 36 are spaced equidistant from one another. In other embodiments, the thickness of the magnetic materials 40, 42 is varied for different layers 36, wherein the plurality of insulation layers 36 would have unequal, or variant spacing between one another.

Thermal radiation heat transfer, as defined by the Stephan-Boltzmann law, defines heat transfer between parallel surfaces as a function of the emissivities of the surfaces of the warm absolute temperature against the cold absolute temperature. This radiation law suggests the amount of radiation given off by a body is proportional to the 4th power of its temperature, and is expressed by the following equation:

$$E = \sigma \cdot T^4$$

where E is the amount of radiation emitted by the body in Watts per square meter (W/m$^2$), σ is a constant equal to 5.675×10$^{-8}$ W/m$^2$·K$^4$, and T is the temperature of the wall in Kelvin. As a result of raising the temperatures to the fourth power, the impact of radiation between reflective radiation barriers near the inner tank, or cold wall, of the cryogenic vessel drops dramatically from the impact of radiation between reflective radiation barriers near the vessel's warm outer tank wall. Correspondingly, the temperature difference between the reflective barriers increases as the cold inner tank wall is approached. Thus, when cryogenic multilayer insulation is used to insulate the space between the inner and outer vessels of a Dewar vessel system, optimum results are maintained when the reflective layers near the cold wall of the inner vessel are spaced further apart than the heat reflective layers closer to the warm wall. For this reason, it is possible for various embodiments of the present invention to yield a more optimized thermal performance by providing variably spaced multi-layer insulation. One embodiment of the present invention includes having the insulation layers 36 disposed near the outer tank 16 more closely spaced between one another than the insulation layers disposed near the inner tank 12.

The present invention also relates to a method of insulating a cryogenic storage tank 32. The method includes providing an inner tank 12 surrounded by a plurality of magnetically repelled insulation layers 36. The insulation layers 36 are arranged having the north pole of one layer's magnetic material 40 adjacent the north pole of a neighboring layer's magnetic material 40, and the south pole of one layer's magnetic material 42 adjacent the south pole of a neighboring layer's magnetic material 42. In certain embodiments, the insulation layers 36 surround the entirety of the inner tank 12. In other embodiments, the insulation layers 36 surround a portion of the inner tank 12. An outer tank 16 is provided surrounding the insulation layers 36, defining a sealed cavity 24 for the insulation layers 36 between the inner 12 and outer 16 tanks. The cavity 24 is preferably under a vacuum of about 7.5×10$^{-5}$ Torr.

Any abutting edges of insulation 26 can be attached by appropriate means, including but not limited to, heat reflective tape and mechanical fasteners. Preferably reflective tape is used such that leaks and heat shorts are avoided. While it is presently preferred that the cryogenic storage tank 32 has a substantially cylindrical structure with hemispherical shaped ends and circular cross-sections, it should be understood that variations can be realized for cylinders having any cross-sectional shape. For example, the inner tank 12 may be generally ellipsoidal or the like. Notwithstanding the variations, the magnetic multi-layer insulation 34 and outer shell 16 should usually have the same overall shape in their cross-sections as the inner tank 12, although it is not required.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cryogenic storage vessel, comprising:
    an inner tank having a containment volume storing a cryogenic fluid;
    an outer tank surrounding said inner tank and defining an insulation space therebetween, said insulation space having a pressure less than atmospheric pressure; and
    at least two insulation layers disposed in said insulation space and surrounding said inner tank,
    wherein said insulation layers are separated from one another by magnetic repulsion.

2. A cryogenic storage vessel according to claim 1, wherein said insulation layers are separated from one another by a magnetic field having a flux density from about 0.2 and about 0.5 Tesla.

3. A cryogenic storage vessel according to claim 1, wherein at least one of said insulation layers comprises an electromagnetic material.

4. A cryogenic storage vessel according to claim 1, wherein said insulation layers have a thickness from about 50 to about 90 microns.

5. A cryogenic storage vessel according to claim 1, wherein said insulation layers comprise a metallized polyester substrate.

6. A cryogenic storage vessel according to claim 1, wherein at least one of said insulation layers comprises a reflective surface.

7. A cryogenic storage vessel according to claim 6, wherein said reflective surface comprises a material selected from the group consisting of aluminum foil, gold foil, copper foil, silver foil, zinc foil, and mixtures thereof.

8. A cryogenic storage vessel according to claim 1, wherein said insulation layers comprise:
    a carrier support structure having a first major surface adjacent a north pole of a magnetic material, and a second opposite major surface adjacent a south pole of a magnetic material,
    wherein said insulation layers are spaced apart from one another and are arranged having north magnetic poles adjacent north magnetic poles and south magnetic poles adjacent south magnetic poles.

9. A cryogenic storage vessel according to claim 1, wherein a distance between adjacent insulation layers is uniform.

10. A cryogenic storage vessel according to claim 1, wherein said at least two insulation layers include a plurality of insulation layers that are spaced equidistant from one another.

11. A cryogenic storage vessel according to claim 1, wherein said at least two insulation layers include a plurality of insulation layers that have variant spacing between one another.

12. A cryogenic storage vessel according to claim 11, wherein insulation layers disposed near said outer tank are more closely spaced between one another than insulation layers disposed near said inner tank.

13. A cryogenic storage vessel according to claim 1, wherein at least one of said insulation layers entirely surrounds said inner tank.

14. A cryogenic storage vessel according to claim 1, wherein at least one of said insulation layers surrounds a portion of said inner tank.

15. A method of insulating a cryogenic storage vessel, comprising:

providing an inner tank;

providing an outer tank surrounding said inner tank and defining an inner space therebetween; and surrounding said inner tank with a plurality of magnetically repelled insulation layers.

16. A method according to claim 15, wherein surrounding said inner tank with a plurality of magnetically repelled insulation layers comprises providing insulation layers comprising a carrier support structure having a first major surface adjacent a north pole of a magnetic material and a second and opposite major surface adjacent a south pole of a magnetic material.

17. A method according to claim 16, comprising spacing said insulation layers apart from one another and arranging said insulation layers having north pole magnetic materials adjacent north pole magnetic materials, and south pole magnetic materials adjacent south pole magnetic materials.

* * * * *